(12) United States Patent
Cox, Jr.

(10) Patent No.: US 9,221,377 B2
(45) Date of Patent: Dec. 29, 2015

(54) BOAT TRANSPORTING APPARATUS

(76) Inventor: John Paul Cox, Jr., Walker, LA (US)

( * ) Notice: Subject to any disclaimer, the term of this patent is extended or adjusted under 35 U.S.C. 154(b) by 1004 days.

(21) Appl. No.: 13/199,155

(22) Filed: Aug. 22, 2011

(65) Prior Publication Data

US 2013/0051960 A1   Feb. 28, 2013

(51) Int. Cl.
*B65F 3/26* (2006.01)
*B60P 3/10* (2006.01)

(52) U.S. Cl.
CPC ............. *B60P 3/1066* (2013.01); *B60P 3/1033* (2013.01)

(58) Field of Classification Search
CPC ........................................................ B60P 1/00
USPC ................................. 414/494, 500; 280/414.1
See application file for complete search history.

(56) References Cited

U.S. PATENT DOCUMENTS

| 4,560,316 A | * | 12/1985 | Daniels | 414/481 |
| 4,923,243 A | * | 5/1990 | Drahos | 296/157 |
| 2008/0014067 A1 | * | 1/2008 | Calder | 414/500 |

* cited by examiner

*Primary Examiner* — Saul Rodriguez
*Assistant Examiner* — Willie Berry, Jr.
(74) *Attorney, Agent, or Firm* — Keaty Law Firm LLC

(57) ABSTRACT

A frame rack is detachably positioned on a bed of a pickup truck. A winch is secured to one end of the frame rack. A pair of spaced parallel bottom rollers is secured to the opposite end of the frame rack. The bottom rollers are supported by a brace assembly, which engages a hitch receiver carried by the truck. A boat bow is tied to a rope and gradually pulled onto the bed of the truck by the winch pulling the rope. Once the boat is loaded on the truck it is supported by the frame rack during the transport.

3 Claims, 7 Drawing Sheets

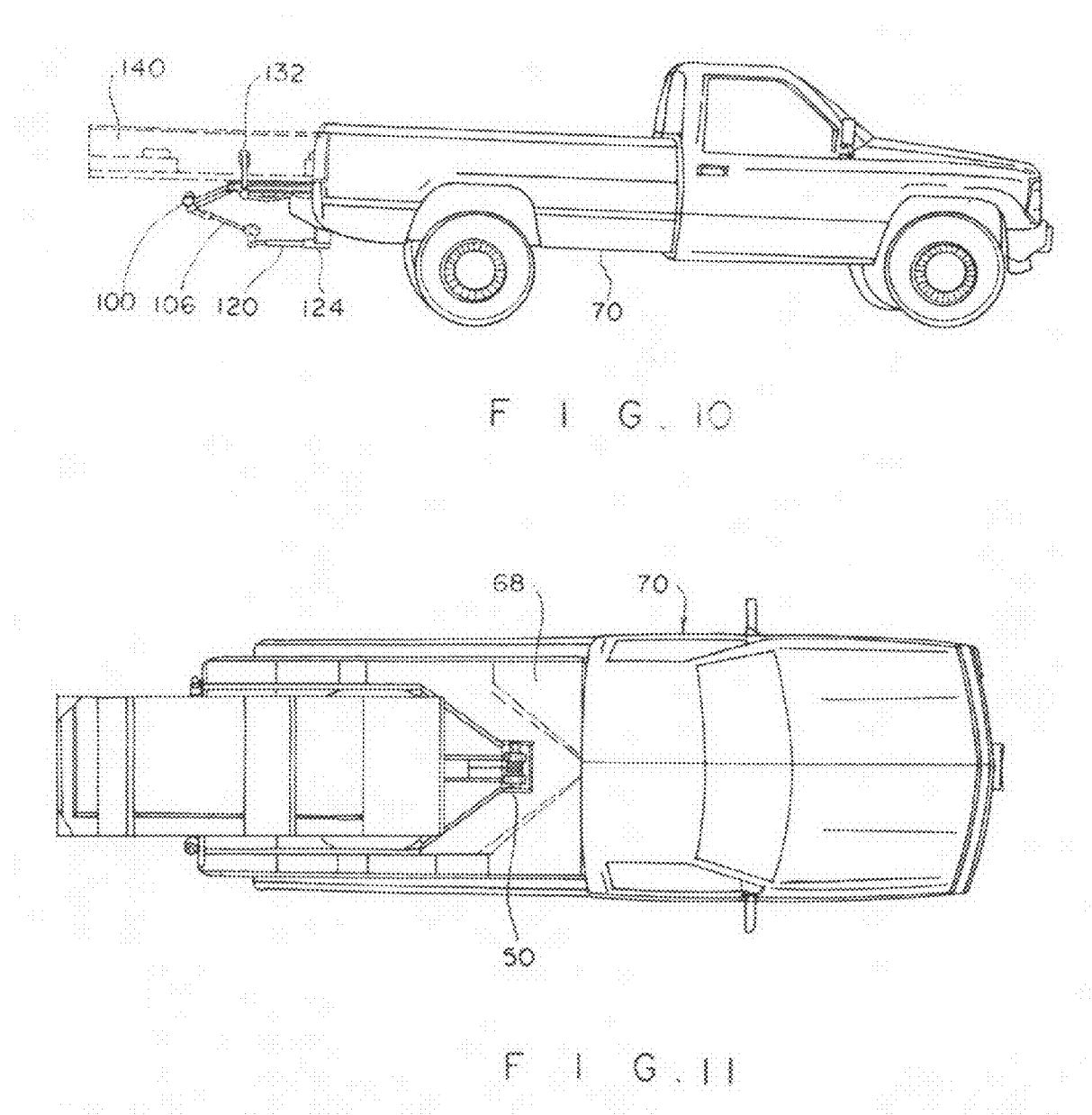

BOAT TRANSPORTING APPARATUS

BACKGROUND OF THE INVENTION

This invention relates generally to the field of vehicle racks and more particularly to a system and method for transporting a boat on the cargo bed of a pickup truck.

Small, lightweight watercraft is typically transported on specially designed trailers towed by a truck or SUV. This method requires that the boat owner obtain a trailer tag or license plate permitting operation of the trailer on public roads, buy insurance, obtain a license for a trailer, etc. Moreover, the owner must find a space in which to store the trailer when not in use. Further, a boat stored on a trailer in the owner's back yard can be easily stolen by miscreants backing up to a trailer that contains the boat and towing the trailer with the boat away.

Alternatively, the boats can be secured in the beds of large pickup trucks by ropes, cables or "bungee" cords. However, this method can be time-consuming and inadequate for securing the boat in the truck bed if not performed properly. Additionally, the ease of loading and unloading a boat depends in large part on the terrain of a river bank or lake shore. Often times, the banks are very steep, without a ramp, and the trailer wheels sink into the clay, making it impossible to launch a watercraft into the water.

The present invention contemplates elimination of drawbacks associated with conventional methods of transporting a watercraft and provision of a rack apparatus detachably mountable on a pickup truck and configured to support a boat.

SUMMARY OF THE INVENTION

It is, therefore, an object of the present invention to provide an apparatus and method for transporting a watercraft on a bed of a pickup truck.

It is another object of the invention to provide a boat-supporting rack detachably mountable on a bed of a pickup truck.

These and other objects of the invention are achieved through a provision of a boat-carrying rack apparatus suitable for mounting on a pickup truck and for carrying a boat. The boat-loading, unloading, and boat-carrying apparatus has a rack frame assembly configured for receiving the boat, the frame assembly comprising a plurality of frame members configured for resting on the bed of the pickup truck while supporting the boat. The plurality of frame members comprises a pair of elongated side frame members, a front frame member spanning between ends of the side frame members, a rear frame member spanning between opposite ends of the side frame members, and a pair of angular braces, each angular brace being secured to and extending at an angle to, a respective side frame member.

A bottom roller assembly is secured to the rear frame member, said bottom roller assembly being configured to form a ramp for the boat being loaded and unloaded from the pickup truck. A pair of space side roller assemblies is secured to the rear frame member and extends upwardly therefrom, said side roller assemblies being configured to contact hull of the boat and guide the boat as the boat is being loaded and unloaded from the pickup truck. A brace assembly is adjustably attached to the bottom roller assembly; the brace assembly is configured for engagement with the hitch receiver, while supporting the bottom roller assembly.

A mounting means detachably secures the rack frame assembly on the pickup truck. The mounting means comprises an attachment member secured to the bed of the pickup truck and a brace assembly detachably engageable with the hitch receiver. A winch assembly with a length of a rope wound thereon is coupled to the rack frame assembly. The winch assembly is detachably mounted on the truck bed.

A user secures the brace assembly with the hitch receiver and aligns the boat with the bottom roller assembly. The user then lowers the tail of the truck and ties a bow of the boat to the rope. The user then activates the electrical winch gradually pulling the boat onto the truck bed. The side roller assemblies guide the boat hull as the boat is being loaded into the truck. Once the boat is positioned on the rack assembly the winch is deactivated and the boat can be transported on the pickup truck.

BRIEF DESCRIPTION OF THE DRAWINGS

Reference will now be made to the drawings, wherein like parts are designated by like numerals, and wherein

FIG. 10 is a side view of a truck with the roller brace assembly engaged with the tow hitch.

FIG. 11 is a top view of the boat positioned on the rack assembly and secured on the truck bed.

DETAIL DESCRIPTION OF THE INVENTION

Figure 1:
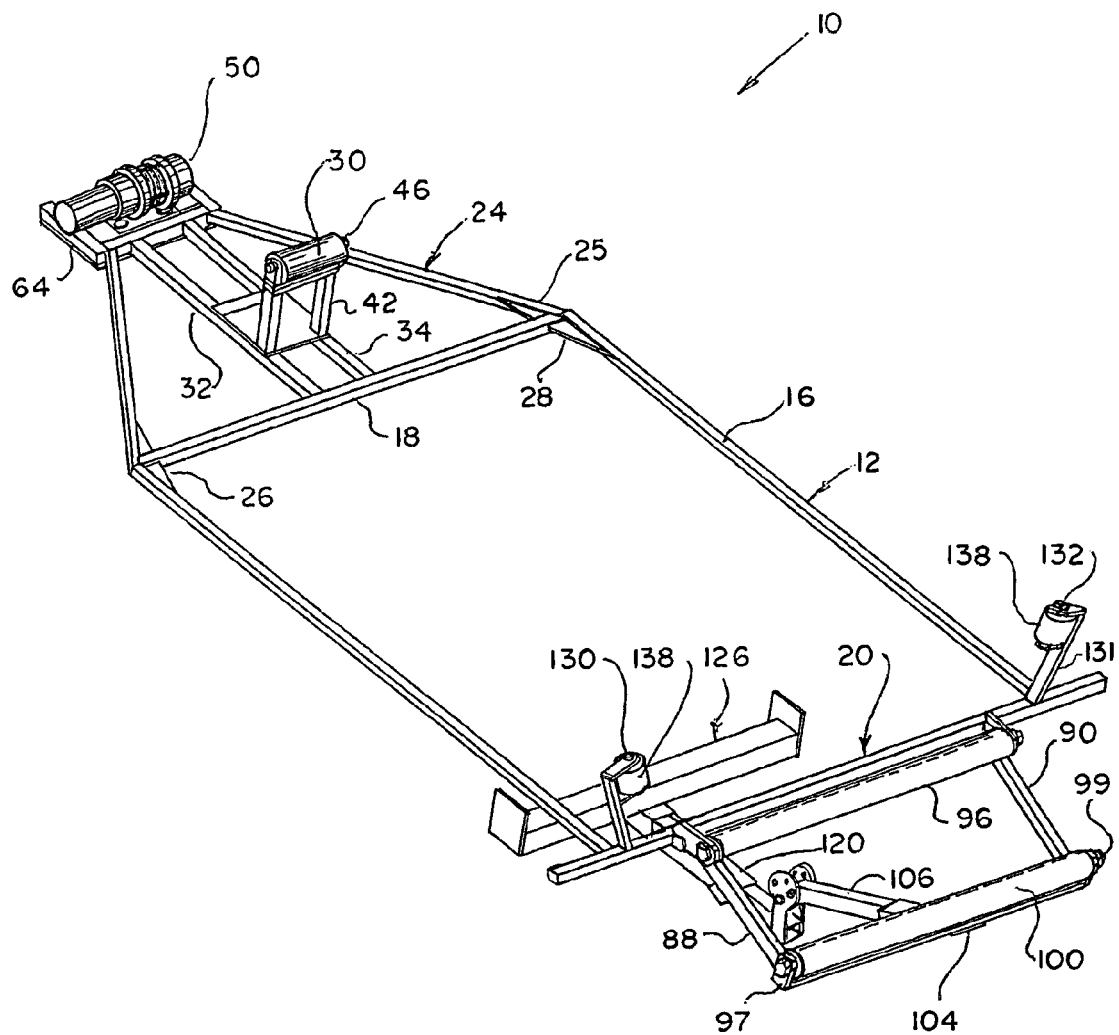
FIG. 1 is a perspective view of the boat supporting apparatus of the present invention.
Figure 2:
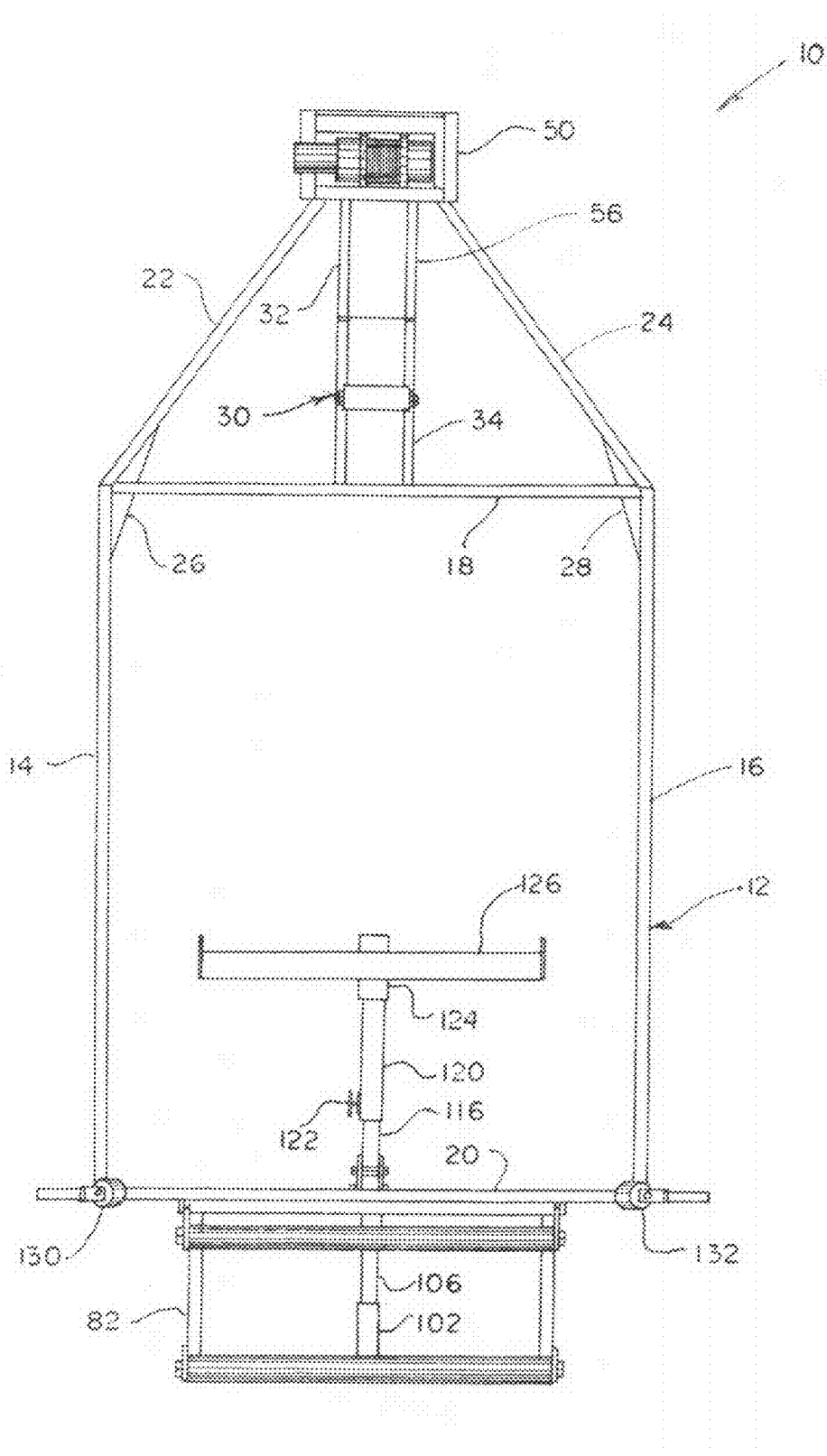
FIG. 2 is a top view of the boat supporting apparatus of the present invention.
Figure 3:
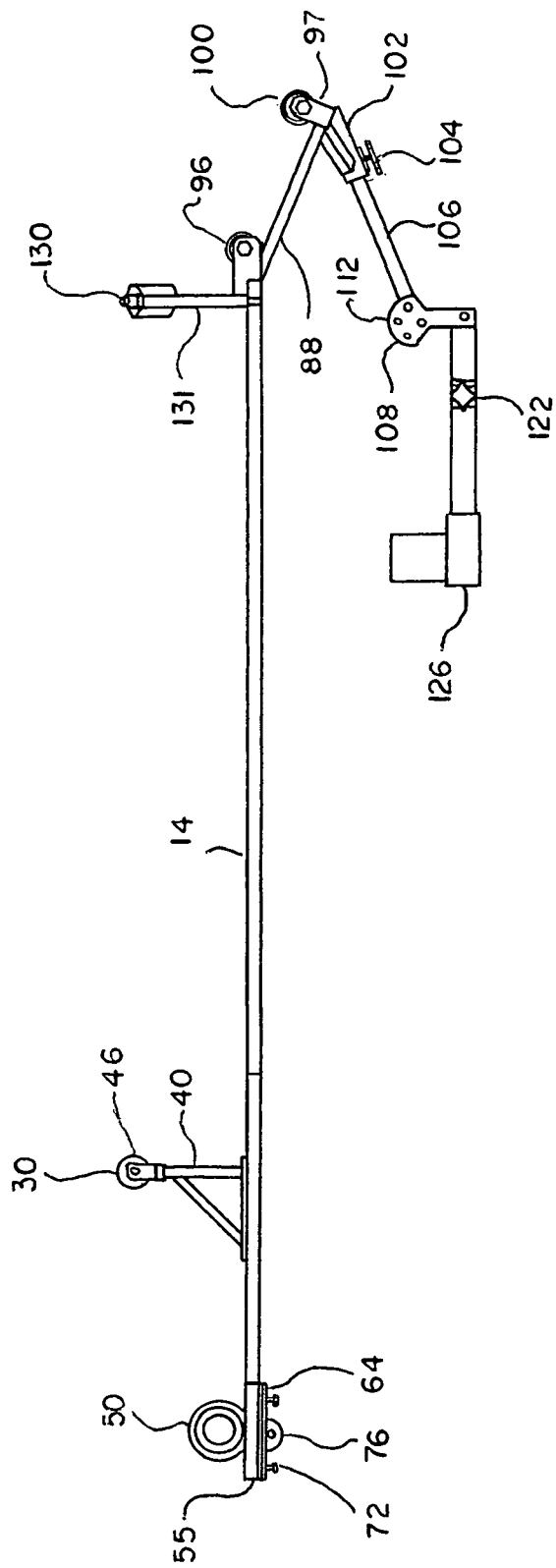
FIG. 3 is a side view of the boat supporting apparatus of the present invention.

Turning now to the drawings in more detail, numeral 10 designates the boat-supporting rack apparatus of the present invention. The rack apparatus 10 comprises an elongated open rack frame assembly 12, which can be constructed of a non-corrosive lightweight material, such as for instance aluminum square tubing. The rack frame 12 comprises a plurality of rack frame members configured to rest on the bed of a pickup truck. The plurality of rack frame members comprises a pair of elongated parallel side frame members 14 and 16 spanned by a front frame member 18 and a rear frame member 20 at opposite ends thereof. As can be seen in FIGS. 1 and 2, the rear frame member 20 has greater longitudinal dimensions than the front frame member 18. A first angular brace member is secured, by its proximate end 23, at an acute angle to the first side frame member 14. A second angular brace member 24 is secured, by its proximate end 25, at an acute angle to the second side frame member 16. The brace members 22 and 24 extend forwardly of the front frame member 18. A pair of stiffening plates 26 and 28 is secured at the intersection of the first side frame member 14 with the first brace 22 and at the intersection of the second side frame member with the second brace member 24.

A bow stop assembly 30 is secured to the front frame member 18. The bow stop assembly 30 comprises a pair of parallel supporting bars 32, 34 fixedly attached at a right angle to the front frame member 18, a support plate 36 attached to the supporting bars 32, 34 and a yoke member 38. The yoke member 38 comprises a pair of upright posts 40, 42 having their lower ends resting on the support plate 36 and supporting, at their upper ends a bow roller 46. The bow roller 46 is rotationally mounted on a bow roller pin 48, which passes through the upper ends of the upright posts 40, 42. The bow roller pin 48 and the bow roller 46 extend transversely to longitudinal axes of the upright posts 40, 42.

Free ends of the supporting bars 32, 34 are secured to winch assembly 50, which comprises an electrically operated winch 52 mounted on a winch base 54. The winch 52 carries a length of a cable or rope 53 wound thereon. The winch 52 can be battery operated or connected to the electrical circuit of the pick-up truck, if desired. The winch can be remotely controlled by a remote control (not shown).

Figures 4, 5:
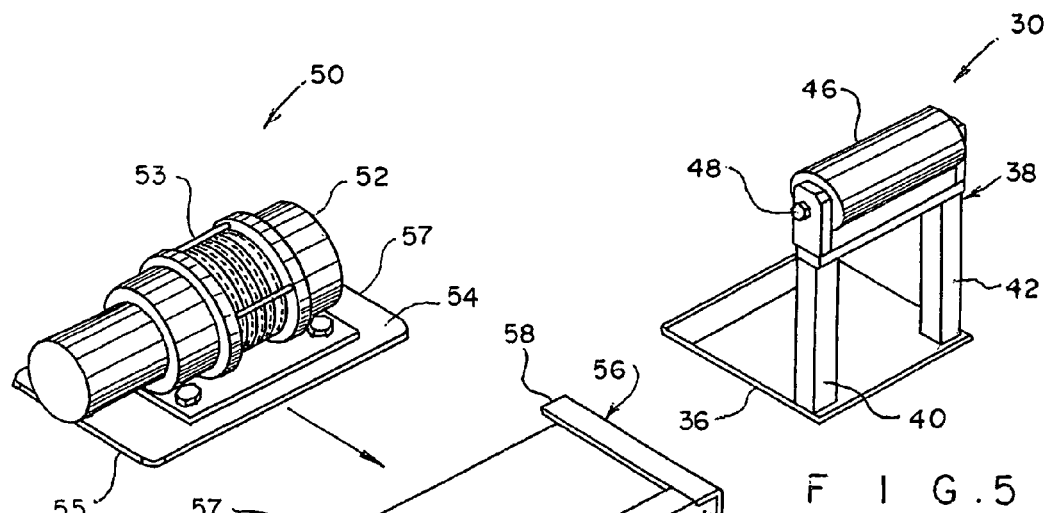
FIG. 4 is a detail view of a winch and latch assembly.
FIG. 5 is a detail view of a bow stop assembly.

The winch base 54 can be rectangular in configuration, although other shapes can be used, as well. The winch base 54 is configured for detachable engagement with a latch plate 56, which can be also rectangular, as shown in FIG. 4. The latch plate 56 is formed with inwardly turned lips 57, 58 on opposite sides thereof. The lips 57, 58 each forms a U-shaped channel 59, 60, respectively, with a bottom 62 of the latch plate 56. The winch base 54 has opposing sides 55, 57, which are sized and shaped to slide into the channels 59, 60, thereby engaging the winch base on the latch plate 56. The latch plate is secured to free ends of the angular braces 22, 24 and the supporting bars 32, 34.

An attachment member 64 is fixedly attached to a bed 68 of a truck 70. The attachment plate receives a plurality of attachment members, such as bolts 72 extending through corresponding openings formed in the attachment member 64 and into the bed 68 of the truck 70. An opening 74 is formed in the center of the attachment member 64; the opening 74 is configured to receive a latch member 76 secured on the bottom 62 of the latch plate 56. When the latch member is locked in place, the winch assembly is secured on the bed of the truck 70.

A bottom roller assembly 80 is secured to the rear frame member 20. The bottom roller assembly 80 comprises a rectangular roller frame 82, which can be constructed from the same material as the rack frame 12. The roller frame 82 comprises a pair of parallel proximate and distant bars 84, 86 spanned by shorter side bars 88, 90. Roller brackets 92, 94 are attached to opposing ends of the proximate bar 84. A roller pin 95 extends through the free ends of the roller brackets 92, 94. A first elongated bottom roller 96 is mounted on the pin 95 in rotationally engagement therewith. The distant bar 86 is similarly provided with a pair of opposing brackets 97, 98. A roller pin 99 is engaged between the roller brackets 97, 98 and carries a second elongated bottom roller 100, which is mounted for rotation about an axis formed by the roller pin 99.

The bottom roller assembly is adjustably connected to a roller brace assembly 101. A first securing arm 102 is attached midway along the length of the distant bar 86. The first securing arm 102 comprises hollow tubing made from a non-corrosive material. A first retractable spring-loaded knob 104 is attached to the first securing arm 102. The roller brace assembly 101 comprises a second securing arm 106, which is configured for telescopic sliding engagement with the first securing arm 102 of the bottom roller assembly 80. The second securing arm 106 is provided with a plurality of through openings 107 for receiving a locking pin of the first retractable knob 104. The distance of extension of the bottom roller assembly relative to the roller brace assembly 101 can be adjusted by selectively extending the pin of the first retractable knob 104 through any of the openings 107.

Figure 12:
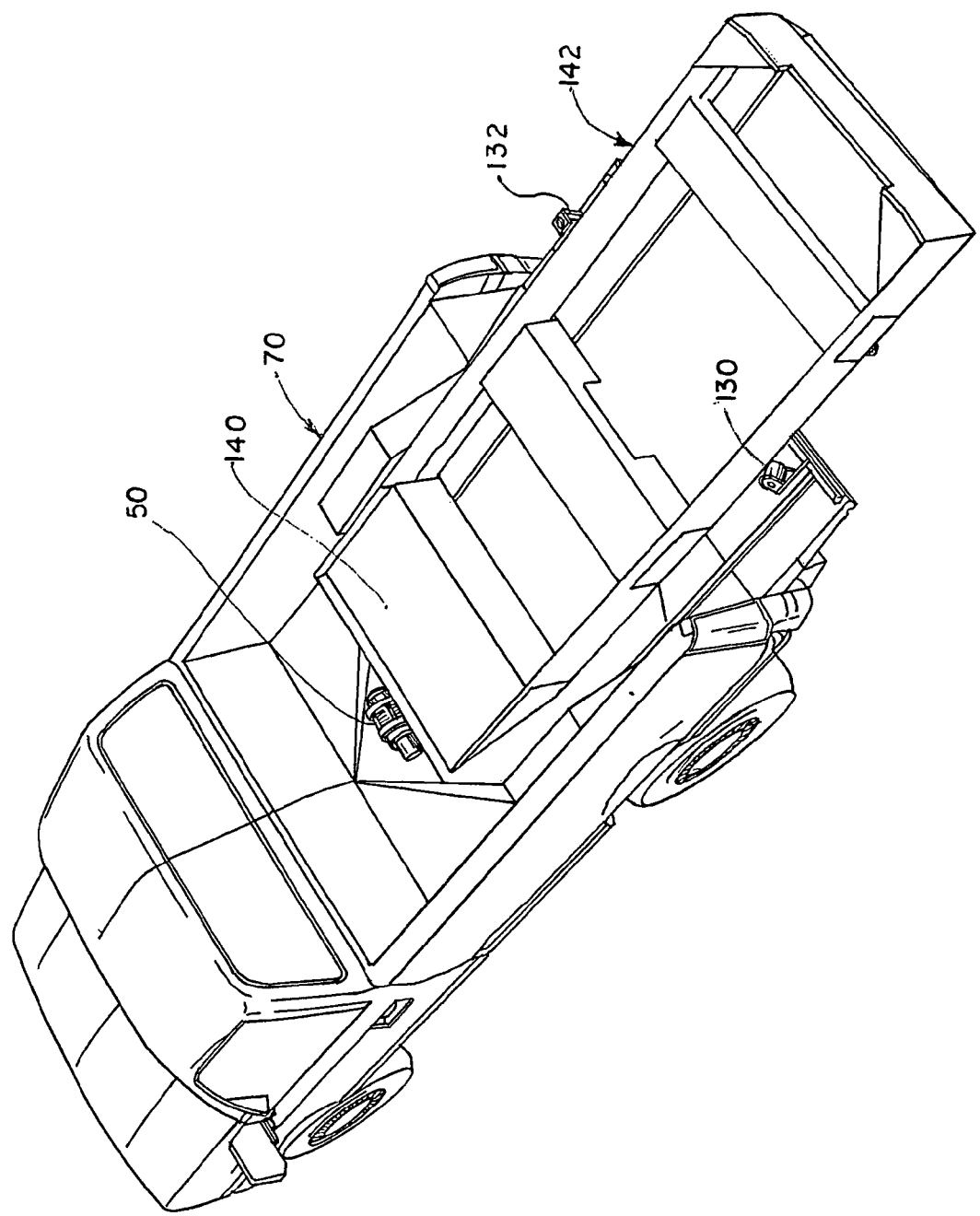
FIG. 12 is a perspective view schematically illustrating position of a boat on the truck bed.

A free end of the second securing arm 106 is secured for a limited pivotal movement between brace assembly brackets 108, 110, which are retained in a spaced-apart, parallel relationship to each other by one or more bolts 112 (FIG. 12). The brace assembly brackets 108, 110 are mirror images of each other, each having an upper part 109, 111, respectively and a lower part 113, 114, respectively. The second securing arm is positioned between the upper parts 109,111 of the brace assembly brackets. A third securing arm 116 is secured for a limited pivotal movement to be received in the space between the lower parts 113, 114 of the brace assembly brackets 108, 110, being secured to the brace assembly brackets by a 118. An opposite end of the third securing arm 118 is telescopically engaged within a fourth arm 120, which is suitably configured to receive the third securing arm 116 in a sliding engagement therein.

A second retractable spring-loaded knob 122 is secured to the fourth securing arm 120. A retractable pin (not shown) of the second retractable knob 122 engages within any of the openings formed through the third securing arm 116 to extend or retract the third securing arm 116 in relation to the fourth securing arm 120.

The brace assembly 101 is adapted for engagement with a hitch receiver 124 of a trailer hitch 126 secured on the truck 70. Advantageously, the profile of the fourth securing arm 120 complements the inner profile of the hitch receiver 124, such that the brace assembly 101 can be detachably secured with the trailer hitch and support the bottom roller assembly 80 on the truck 70.

Figure 6:
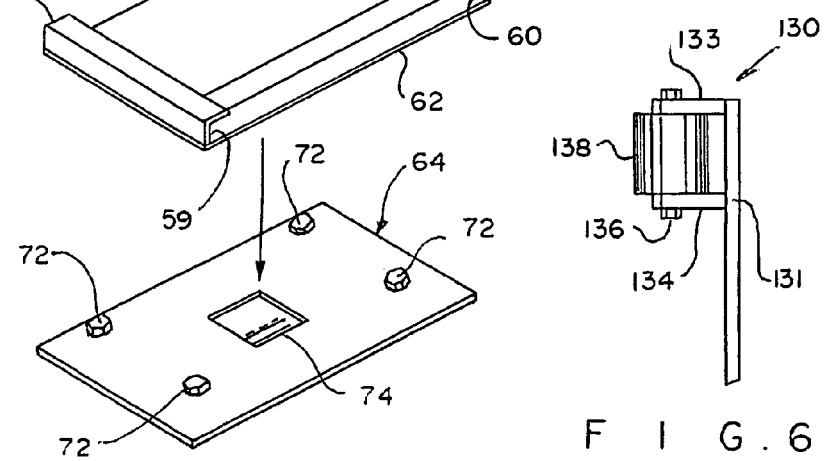
FIG. 6 is a detail view of a side roller.
Figure 7:
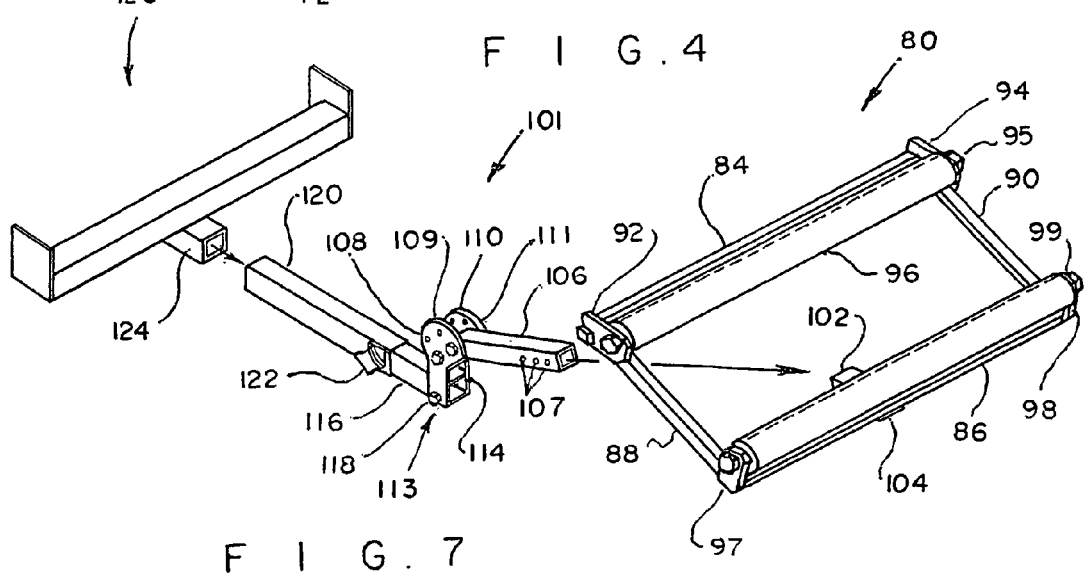
FIG. 7 is a detail view of a roller assembly and a roller brace assembly.

The rack apparatus of the present invention also comprises a pair of side roller assemblies 130, 132 shown in detail in FIG. 6. Each side roller assembly 130, 132 comprises an upright post 131 carrying a pair of spaced-apart parallel brackets 133, 134. The brackets 133, 134 extend at a right angle to the longitudinal axis of the post 131. A rotating pin 136 is secured between the brackets 133, 134. A side roller 138 is mounted on each pin 136 and is adapted for rotation about the axis formed by the pin 136. As can be seen in FIG. 1, the lower ends of the posts 131 are secured at an obtuse angle to the rear frame member 20 a distance from the bottom roller assembly 80. The side rollers 130, 132 extend upwardly from the rear frame member 20 and are configured to guide the hull of the boat being loaded and unloaded from the truck 70.

Figure 8:
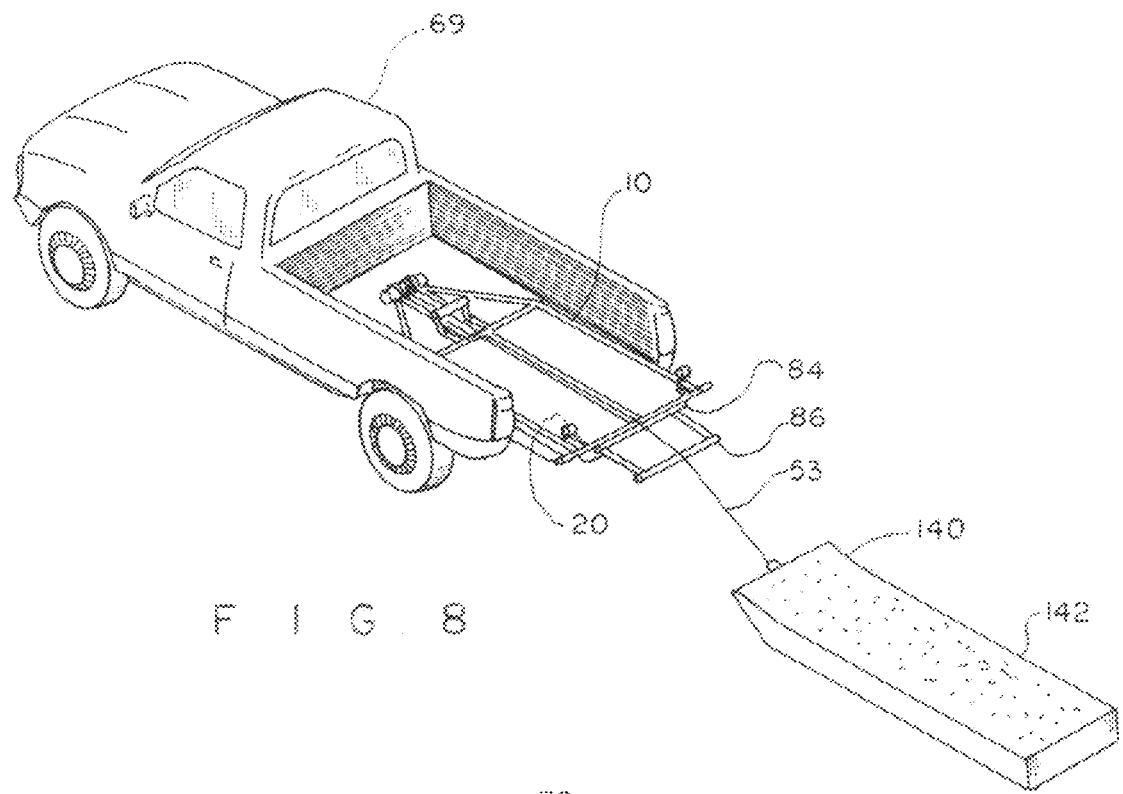
FIG. 8 is a schematic view illustrating a method of loading a boat on the rack apparatus.
Figure 9:
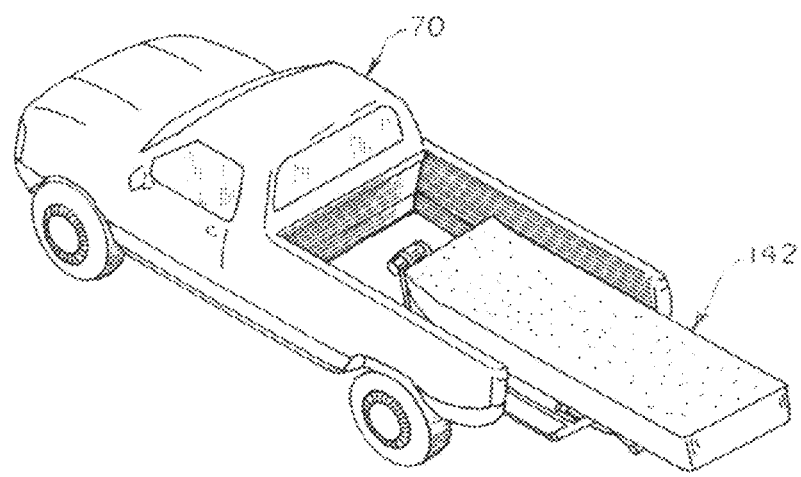
FIG. 9 is a schematic view illustrating a step of positioning a boat on the rack apparatus.

In operation, a boat owner secures the rack apparatus 10 on the bed 68 of the truck 70 by engaging the winch base 54 on the latch plate 56. The latch plate 56 is then locked in position with the attachment member 64. Since the attachment member 64 is preferably secured close to a truck cabin 69, the winch assembly 50 is positioned at the very proximate end of the truck bed 68. The user then engages the brace assembly with the hitch receiver 124, making sure than the securing arms extend to a distance sufficient to form a ramp for a boat being loaded. Then the tail gate 71 of the truck 70 is lowered, as shown in FIGS. 8 and 9, supporting the distant end of the rack apparatus 10, while allowing the bottom roller assembly to extend over the tail gate 71.

The user then connects the winch 52 to a power source, such as a battery or the truck power system. The user positions a boat 142 on the ground in a general alignment with the bottom roller assembly 80. The user then unrolls a length of the rope 53 and guides it over the bow roller 46. The end of the rope 53 is then tied to a bow 140 of the boat 142. The winch 52 is energized pulling the boat 142 onto the truck bed 68. The bow 140 of the boat is lifted such that the bottom of the boat hull slides across the bottom rollers 84, 86. As the boat hull moves onto the truck bed 86, the side rollers 130, 132 frictionally engage port and starboard of the hull, guiding the boat 142 as it is loaded on the truck. Once the bow 140 reaches the bow stop assembly 30, the winch 52 is de-energized and the pulling force is stopped. The boat 142 is now loaded on the truck 70, as shown in FIGS. 9-12.

It is acceptable to transport a boat 142 that has longitudinal dimensions greater than the length of the truck bed 68. Depending on the laws of the state, the user may need to secure a warning signal on the stern of the boat. The bottom of the boat hull will rest on the bed 68 of the truck 70 and on the bottom roller 96, as shown in FIG. 10. The bow of the bottom will be adjacent the bow stop assembly 30. With the boat this loaded, the user can transport the boat to a desired waterfront location. When unloading the boat, the procedure is reversed, with the winch playing out the cable 53, while the boat hull slides into the water across the bottom rollers 86 and 100.

It is envisioned that depending on the size of the truck, the rack apparatus may be about 10 feet in length and about 5 feet wide. In one aspect of the invention, the bottom rollers 86 and 100 are about 32" long and distanced by about 16" from each other. Of course, these dimensions are only exemplary. It will be appreciated by those skilled in the art that the boat-carrying rack of this invention is simple in construction and operation, lightweight and effective for loading and unloading various types of lightweight watercraft. The modifications to the bed of the truck are minimal and can be accomplished without professional assistance. The rollers used in the apparatus of the present invention can be constructed of a variety of materials, including resilient flexible materials, for instance rubber, urethane rubber and the like.

Many changes and modifications can be made in the design of the present invention without departing from the spirit thereof. I, therefore, pray that my rights to the present invention be limited only by the scope of the appended claims.

I claim:

1. A method of loading a boat onto a bed of a pickup truck provided with a hitch receiver, the method comprising the steps:

providing a rack frame assembly configured for receiving the boat, the rack frame assembly comprising a plurality of frame members configured for resting on the bed of the pickup truck while supporting the boat, said plurality of frame members comprising a pair of elongated side frame members, a front frame member spanning between ends of the side frame members, a rear frame member spanning between opposite ends of the side frame members, and a pair of angular braces, each angular brace being secured to and extending at an angle to, a respective side frame member;

providing a bottom roller assembly secured to the rack frame assembly, said bottom roller assembly defining a ramp for loading and unloading the boat, wherein the bottom roller assembly comprises a generally rectangular roller frame having a proximate bar, a means for securing the proximate bar in a generally parallel relationship to the rear frame member, a distant bar positioned in a parallel relationship to the proximate bar, and a pair of side bars spanning between the proximate bar and the distant bar;

providing a brace assembly configured to adjustably secure the bottom roller assembly to the hitch receiver of the pickup truck, wherein the distant bar carries a first arm, said brace assembly comprising a second arm telescopically adjustably engageable with the first arm, a third arm pivotally connected to the second arm, and a fourth arm telescopically adjustably engageable with the third arm, a free end of the fourth arm being configured for detachable engagement with the hitch receiver of the pickup truck;

providing a pair of side roller assemblies secured to the rack frame assembly, the side roller assemblies defining a guide for a boat hull being loaded and unloaded from the pickup truck;

providing a winch assembly secured to the rack frame assembly a distance from the bottom roller assembly, said winch assembly comprising a winch with a length of rope wound thereon;

detachably securing the rack frame assembly on the bed of the pickup truck, and securing the brace assembly with the hitch receiver;

lowering a tail gate of the pickup truck and allowing the bottom roller assembly to extend from the tail gate of the pickup truck;

positioning the boat in general alignment with the bottom roller assembly;

attaching an end of the rope to a bow of the boat and activating the winch; and causing the boat to move along the bottom roller assembly onto the bed of the pickup truck, while being guided by the side roller assemblies.

2. The method of claim 1, wherein the proximate bar has opposing ends and wherein a proximate roller bracket is attached to each of the opposing ends, wherein a proximate roller pin extends through each of the proximate roller brackets, and wherein a proximate roller member is rotationally mounted on said proximate roller pin.

3. The method of claim 1, wherein the distant bar has opposing ends and wherein a distant roller bracket is attached to each of the opposing ends, wherein a distant roller pin extends through each of the distant roller brackets, and wherein a distant roller member is rotationally mounted on said distant roller pin.

* * * * *